United States Patent
Yoshikawa et al.

(10) Patent No.: US 6,783,701 B2
(45) Date of Patent: Aug. 31, 2004

(54) ELECTRICALLY CONDUCTIVE FOAM COMPONENT

(75) Inventors: Hitoshi Yoshikawa, Komaki (JP); Satoshi Suzuki, Kasugai (JP); Kunio Ito, Kasugai (JP); Akitoshi Nozawa, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/309,110

(22) Filed: Dec. 4, 2002

(65) Prior Publication Data
US 2004/0110855 A1 Jun. 10, 2004

(51) Int. Cl.$^7$ ............... C08G 18/00; C08J 9/00; H01B 1/00; H01B 1/04
(52) U.S. Cl. .............. 252/500; 252/103; 252/105; 521/85; 521/103; 521/105
(58) Field of Search ............... 521/85, 103, 105; 252/500, 506, 509, 103, 105

(56) References Cited

U.S. PATENT DOCUMENTS

| | | | |
|---|---|---|---|
| RE30,193 E | * | 1/1980 | O'Shaughnessy ........... 521/85 |
| 4,198,486 A | * | 4/1980 | Mylich et al. |
| 4,551,483 A | * | 11/1985 | Hicks |
| 4,968,724 A | * | 11/1990 | Mascioli |

FOREIGN PATENT DOCUMENTS

| | | |
|---|---|---|
| JP | 10-046023 | 2/1998 |
| JP | 10-048912 | 2/1998 |

* cited by examiner

Primary Examiner—Morton Foelak
(74) Attorney, Agent, or Firm—Armstrong, Kratz, Quintos, Hanson & Brooks, LLP

(57) ABSTRACT

An electrically conductive foam component free from blooming and having a stable electrically conductive property. The electrically conductive foam component is produced by foaming an electrically conductive composition which comprises a base polymer and a borate compound represented by the following general formula (1):

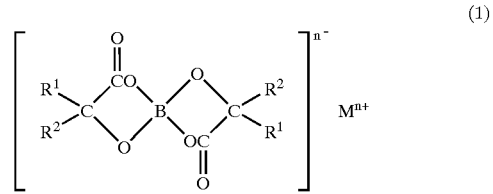

(1)

wherein $R^1$ and $R^2$, which may be the same or different, each represent a hydrogen atom, an alkyl group or an aryl group; M is an alkaline metal or an alkaline earth metal; and n is a positive number.

10 Claims, 1 Drawing Sheet

ELECTRICALLY CONDUCTIVE FOAM COMPONENT

BACKGROUND OF THE INVENTION

1. Field of the Invention

The present invention relates to an electrically conductive foam component and, more-particularly, to an electrically conductive foam component for use as a toner supplying member, a transferring member, a developing member, a charging member, a sheet feeding and transporting member, a cleaning member or the like.

2. Description of the Art

Conventionally, a urethane foam or an elastomer foam is employed as a foam material for a toner supplying member, a transferring member, a developing member, a charging member, a sheet feeding and transporting member and a cleaning member. A quaternary ammonium salt is generally employed as an ion conductive agent to impart an electrically conductive property to the urethane foam and the elastomer foam.

However, a quaternary ammonium salt is not entirely compatible with a urethane polymer and an elastomer. Therefore, the foam material suffers from separation during storage thereof, so that the resulting product suffers from blooming over time and has an unstable electrically conductive property. Hence, there is a need for re-dispersing the quaternary ammonium salt in the material for the production of the product.

In view of the foregoing, it is an object of the present invention to provide an electrically conductive foam component which is free from blooming and has a stable electrically conductive property.

SUMMARY OF THE INVENTION

According to the present invention to achieve the aforesaid object, there is provided an electrically conductive foam component produced by foaming an electrically conductive composition which comprises a base-polymer and a borate compound represented by the following general formula (1):

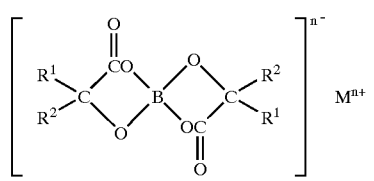

wherein $R^1$ and $R^2$, which may be the same or different, each represent a hydrogen atom, an alkyl group or an aryl group; M is an alkaline metal or an alkaline earth metal; and n is a positive number.

The inventors of the present invention conducted intensive studies on an electrically conductive composition to provide an electrically conductive foam component which is free from blooming and has a stable electrically conductive property. The inventors further conducted studies, focusing on a borate compound which is not generally used for ion conductive applications. As a result, the inventors found that the borate compound is slightly inferior in electrical conductivity to a quaternary ammonium salt, but a product produced by foaming a borate-containing composition has a stable and practically acceptable electrically conductive property ($10^7$ to $10^{10}$ Ω·cm), and that the borate compound is highly compatible with a base polymer. Thus, the inventors found that an electrically conductive foam compound produced by foaming an electrically conductive composition comprising a base polymer and a borate compound represented by the aforesaid general formula (1) is free from blooming and has a stable electrically conductive property, and attained the present invention.

DESCRIPTION OF THE PREFERRED EMBODIMENTS

Figure 1:
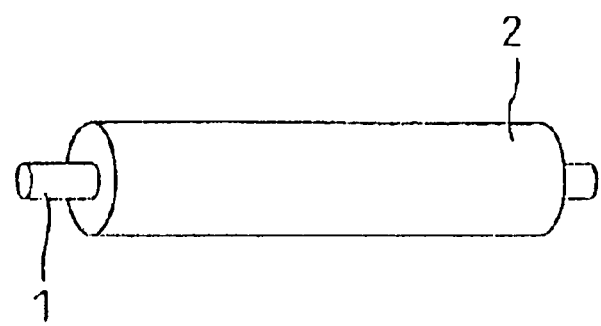
FIG. 1 is a perspective view illustrating a toner supply roll as an example of an electrically conductive foam component according to the present invention.

The present invention will hereinafter be described in detail by way of embodiments thereof.

An electrically conductive foam component according to the present invention is produced by foaming an electrically conductive composition comprising a base polymer and a specific borate compound.

The base polymer is not particularly limited, but examples thereof include urethane polymers, acrylonitrile-butadiene rubbers (NBR), epichlorohydrin rubbers (ECO), chloroprene rubbers (CR), acryl rubbers (ACM), urethane rubbers, polar rubbers having polyoxyalkylene units, and natural rubbers (NR), which may be used either alone or in combination. Among these polymers, liquid polymers such as urethane polymers and liquid rubbers are preferred in consideration of an expansion factor. The rubbers described above may be in a solid form or in a liquid form.

The urethane polymers are not particularly limited, but examples thereof include those derived from ether based polyols such as polyether polyols and polymer polyols, ester based polyols such as diethylene glycol adipate, polycarbonate polyols and polycaprolactam polyols, and olefin based polyols such as polyoxyethylene polyols, polyoxypropylene polyols, polyisoprene polyols, polybutadiene polyols and hydrogenated isoprene polyols, which may be used either alone or in combination. Among these urethane polymers, the urethane polymers derived from the ether based polyols (e.g., the polyether polyols and the polymer polyols) and the ester based polyols (e.g., diethylene glycol adipate) are preferred because they are highly compatible with the aforesaid specific borate compound and less water-absorptive.

The specific borate compound to be used in combination with the base polymer is represented by the following general formula (1):

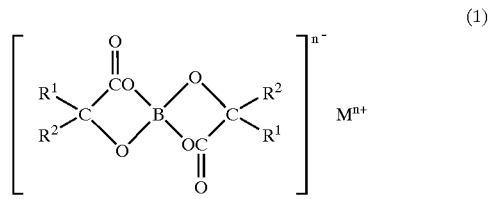

wherein $R^1$ and $R^2_1$ which may be the same or different, each represent a hydrogen atom, an alkyl group or an aryl group; M is an alkaline metal or an alkaline earth metal; and n is a positive number.

In the aforesaid general formula (1), the alkyl group represented by $R^1$ or $R^2$ is not particularly limited, but preferably an alkyl group having a carbon number of 1 to 18. Preferred examples of the alkyl group include an ethyl group, a propyl group, a butyl group and a pentyl group, among which the butyl group and the pentyl group are particularly preferred.

In the aforesaid general formula (1), the aryl group represented by $R^1$ or $R^2$ is not particularly limited, but preferred examples thereof include a phenyl group, a tolyl group, a xylyl group, a biphenylyl group, a naphthyl group, an anthryl group and a phenanthryl group, among which the phenyl group is particularly preferred.

In the aforesaid general formula (1), the alkaline metal or the alkaline earth metal represented by M is not particularly limited, but examples thereof include lithium, potassium, calcium and sodium, among which lithium and potassium are preferred.

Among borate compounds represented by the aforesaid general formula (1), a potassium borate compound represented by the following formula (2) and a lithium borate compound represented by the following formula (3) are preferred in terms of electrical conductivity and dispersion stability. The potassium borate compound represented by the formula (2) is particularly preferred.

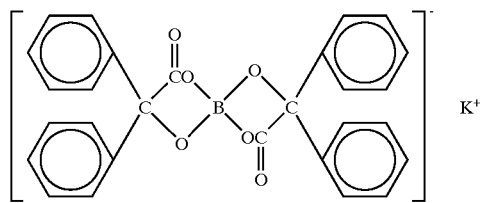

(2)

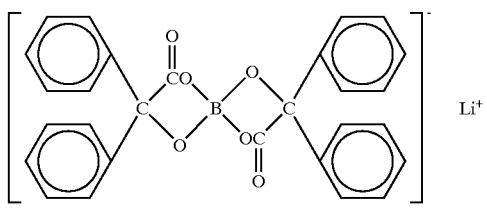

(3)

The borate compound is preferably present in the composition in a proportion of 0.001 to 20 parts by weight (hereinafter referred to simply as "parts"), more preferably 0.05 to 5 parts, based on 100 parts of the base polymer. If the proportion of the borate compound is smaller than 0.001 part, the resulting foam component may have an insufficient electrically conductive property. If the proportion of the borate compound is greater than 20 parts, the resulting foam component tends to have a higher hardness and suffer from blooming.

In addition to the base polymer and the specific borate compound, additives such as one or more of a cross-linking agent, a cross-linking accelerator, a cross-linking assisting agent, an anti-aging agent, a foaming agent, a foaming assisting agent, a catalyst and a foam stabilizer may be blended in the electrically conductive composition as required.

The cross-linking agent is not particularly limited, but may properly be selected according to the base polymer to be employed. Examples of cross-linking agents include an isocyanate, a hydrosilyl cross-linking agent, sulfur, a peroxide and a resin cross-linking agent, which may be used either alone or in combination. Among these cross-linking agents, the isocyanate and the hydrosilyl cross-linking agent are preferred because they provide higher cross-linking rates, higher expansion factors with minute cells and smaller permanent compression strains.

The isocyanate is not particularly limited, but may be a polyisocyanate having two or more functional groups. Specific examples of the polyisocyanate include 4,4'-diphenylmethane diisocyanate (MDI), isophorone diisocyanate (IPDI), 4,4'-dicyclohexylmethane diisocyanate (hydrogenated MDI), trimethylhexamethylene diisocyanate (TMHDI), tolylene diisocyanate (TDI), carbodiimide-modified MDI, polymethylenephenyl polyisocyanate (PAPI), o-toluidine diisocyanate (TODI), naphthylene diisocyanate (NDI), xylene diisocyanate (XDI), hexamethylene diisocyanate (HMDI), p-phenylene diisocyanate (PDI), lysine diisocyanate methyl ester (LDI) and dimethyl diisocyanate (DDI), which may be used either alone or in combination. Among these isocyanates, MDI and TDI are preferred. These isocyanates may be used in the form of an intermediate product, for example, in an adduct form, a prepolymer form or a block form.

The isocyanate is preferably present in the composition in a proportion of 5 to 40 parts, particularly preferably 10 to 25 parts, based on 100 parts of the base polymer.

The hydrosilyl cross-linking agent is not particularly limited, but examples thereof include those having a hydrosilyl group in a molecule thereof. The hydrosilyl group has a silicon atom and a hydrogen atom(s) bonded to at least one of four bonding sites of the silicon atom.

Among the aforesaid hydrosilyl cross-linking agents, hydrosilyl cross-linking agents represented by the following general formulae (4) to (6) are preferred because they are highly compatible with the base polymer and highly resistant to permanent compression strain. In the following general formulae, repeating units identified by numerals m, n, p may be polymerized by any polymerization method, e.g., by random polymerization or block polymerization.

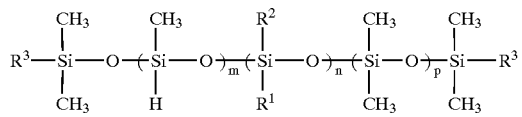

(4)

wherein group $R^1$ is a hydrocarbon group having a carbon number of 2 to 20; group $R^2$ is a hydrocarbon group having a carbon number of 1 to 20; groups $R^3$, which may be the same or different, each represent a hydrogen atom or a methyl group; m is a positive number of not smaller than 1; n is a positive number of not smaller than 1; p is 0 or a positive number; and m, n and p satisfy $2 \leq m+n+p \leq 200$.

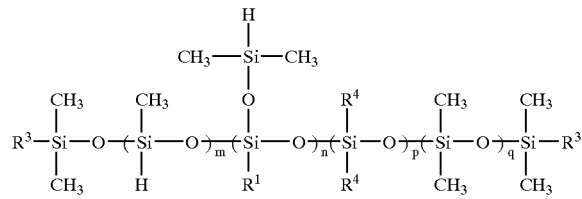

(5)

wherein group $R^1$ is a hydrocarbon group having a carbon number of 2 to 20; groups $R^3$, which may be the same or different, each represent a hydrogen atom or a methyl group;

groups $R^4$, which may be the same or different, each represent a hydrocarbon group having a carbon number of 1 to 20; m is 0 or a positive number; n is a positive number of not smaller than 1; p is 0 or a positive number; q is 0 or a positive number; and m, n, p and q satisfy $1 \leq m+n+p+q \leq 200$.

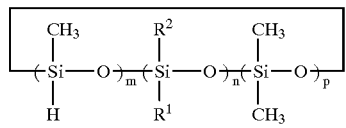

(6)

wherein group $R^1$ is a hydrocarbon group having a carbon number of 2 to 20; group $R^2$ is a hydrocarbon group having a carbon number of 1 to 20; m is a positive number of not smaller than 2; n is a positive number of not smaller than 1; p is 0 or a positive number; and m, n and p satisfy $3 \leq m+n+p \leq 500$.

The hydrosilyl cross-linking agents represented by the aforesaid general formulae (4) to (6) are prepared by the following methods ① to ④, among which the method ③ is particularly preferred for easier preparation of the hydrosilyl cross-linking agents.

① A hydrocarbon compound having a chlorosilyl group (SiCl) in its molecule is treated with a reducing agent (e.g., LiAlH$_4$, NaBH$_4$) for reduction of the chlorosilyl group into a hydrosilyl group.

② A hydrocarbon compound having a functional group is reacted with a compound having a hydrosilyl group and a functional group reactive with the functional group of the hydrocarbon compound.

③ A hydrocarbon compound having an alkenyl group is reacted with a polyhydrosilane compound so that a hydrosilyl group remains in the molecular structure of the resulting reaction product.

④ A cyclic siloxane having a hydrosilyl group is reacted with a cyclic siloxane having a hydrocarbon group.

Among the hydrosilyl cross-linking agents thus prepared, those having the following structural formulae (7) to (11) are particularly preferred. Repeating units in each of the hydrosilyl cross-linking agents may be polymerized by any polymerization method, e.g., by random polymerization or block polymerization.

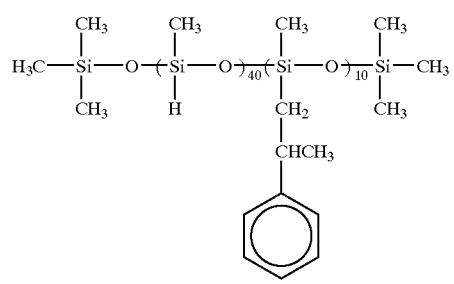

(7)

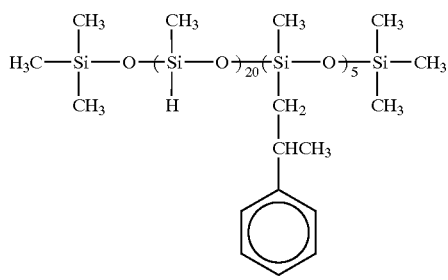

(8)

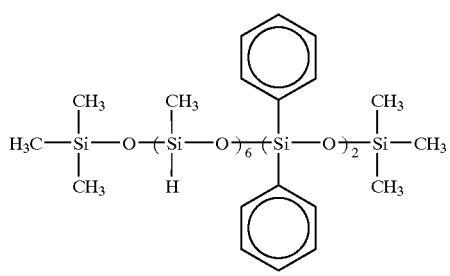

(9)

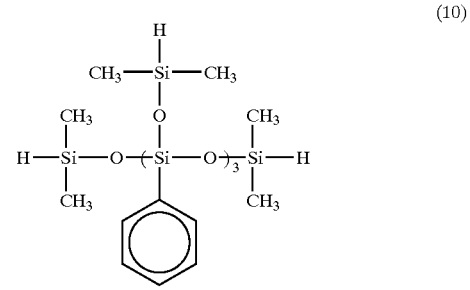

(10)

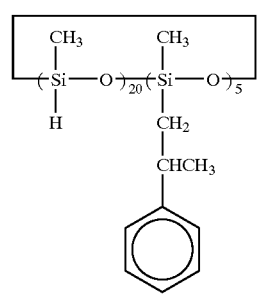

(11)

For example, the hydrosilyl cross-linking agent represented by the above structural formula (7) is prepared through the following reaction:

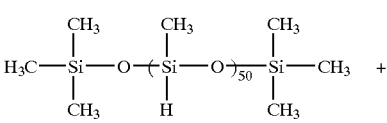 +

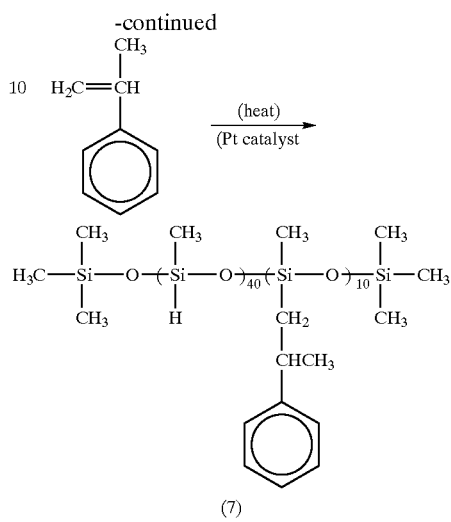

(7)

Preparation of the hydrosilyl cross-linking agents represented by the above structural formulae (8) to (11) is achieved in substantially the same manner as the preparation of the hydrosilyl cross-linking agent represented by the aforesaid structural formula (7).

The hydrosilyl cross-linking agent is preferably present in the composition in a proportion of 1 to 35 parts, particularly preferably 2 to .18 parts, based on 100 parts of the base polymer.

Examples of the foaming agent include water, chemical foaming agents such as N,N'-dinitrosopentamethylenetetramine (DPT), 2,2'-azoisobutyronitrile (AIBN), 4,4'-oxybis(benzene sulfonyl hydrazide) (OBSH), azodicarbonamide (ADCA), p-toluenesulfonyl hydrazide (TSH) and sodium bicarbonate (baking soda), foaming agents which generate water, nitrogen, hydrogen or carbon dioxide in a reaction, foaming agents which disperse and dissolve gas in the composition for foaming of the composition, and foaming agents which utilize a volume change from a hypercritical or hypocritical phase into a gaseous phase by pressure and temperature control.

The foaming agent is preferably present in the composition in a proportion of 1 to 15 parts, particularly preferably 3 to 7 parts, based on 100 parts of the base polymer.

Examples of the catalyst include tertiary amine catalysts, organic metal compounds, and hydrosilylation catalysts.

Examples of the tertiary amine catalysts include: monoamines such as triethylamine (TEA), N,N-dimethylcyclohexylamine (DMEDA); diamines such as N,N,N',N'-tetramethylethylenediamine (TMEDA); triamines such as N,N',N",N"-pentamethyldiethylenetriamine (PMDETA); cyclic amines such as triethylenediamine (TEDA); alcoholainines such as dimethylaminoethanol (DMEA); etheramines such as bis(2-dimethylaminoethyl) ether (BDMEE). These amine catalysts may be used either alone or in combination.

Examples of the organic metal compound include stannous octoate, dibutyltin diacetate, dibutyltin dilaurate and dibutyltin thiocarboxylate, which may be used either alone or in combination.

Examples of the foam stabilizer include silicone based foam stabilizers (polyoxyalkylene-dimethylpolysiloxane copolymers) and non-silicone based foam stabilizers (acrylic copolymers).

Next, a toner supply roll as shown in FIG. 1 will be described as a specific example of the inventive electrically conductive foam component. The toner supply roll is of a single layer structure, which comprises a shaft 1 and an electrically conductive foam layer 2 of the urethane foam or the elastomer foam provided around the shaft 1. In the present.invention, the electrically conductive foam layer 2 is formed by foaming the electrically conductive composition containing the specific borate compound.

The shaft 1 is not particularly limited, but may be a solid metal shaft or a hollow cylindrical metal shaft, for example. Exemplary materials for the shaft 1 include stainless steel, aluminum and plated iron.

As described above, the electrically conductive foam layer 2 is formed by foaming the electrically conductive composition containing the specific borate compound.

Figure 2:
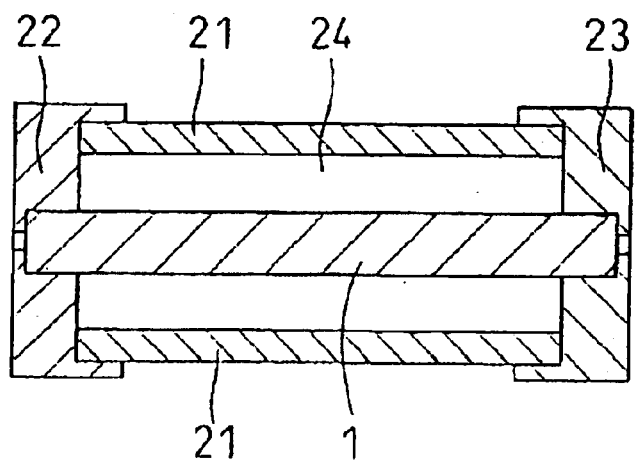
FIG. 2 is a sectional view for explaining a production method for the toner supply roll.

The toner supply roll shown in FIG. 1 is produced, for example, in the following manner. As shown in FIG. 2, a mold is prepared which includes a cylindrical mold portion 21 having a length nearly equal to the axial length of the electrically conductive layer 2 of the toner supply roll and caps 22, 23 for closing opposite ends of the cylindrical mold portion 21. The shaft 1 is positioned in the cylindrical mold portion 21, and the opposite ends of the cylindrical mold portion 21 are closed with the caps 22, 23 with opposite ends of the shaft 1 respectively held by the caps 22, 23, whereby a mold cavity 24 is defined in the cylinder mold portion 21 to provide a final roll shape (outer diameter) of the intended toner supply roll. As the material for the electrically conductive foam layer 2, the electrically conductive composition containing the borate compound is injected into the mold cavity 24, and heated in an oven at a predetermined temperature (about 60° C.) for a predetermined period (about 30 minutes) for foaming and cross-linking thereof. Then, the resulting product is unmolded. Thus, the toner supply roll of the single layer structure is provided, which has the electrically conductive foam layer 2 around the shaft 1 as shown in FIG. 1.

The expansion factor of the electrically conductive foam layer 2 is preferably 2 to 12, particularly preferably 3 to 10. If the expansion factor is smaller than 2, it may be impossible to impart the electrically conductive foam layer with a desired flexibility and a desired cell configuration. If the expansion factor is greater than 12, the electrically conductive foam layer-tends to have an insufficient strength and thereby may be broken during unmolding or chipped during use.

The electrically conductive foam layer 2 typically has a thickness of 2 to 8 mm, preferably 3 to 6 mm.

The structure of the toner supply roll according to the present invention is not limited to the single layer structure shown in FIG. 1, but the toner supply roll may be of a multi-layer structure having two or more layers.

The electrically conductive foam component according to the present invention is not limited to use in a toner supplying member, e.g., the toner supply roll shown in FIG. 1. The electrically conductive foam component is applicable to other electrophotographic apparatus members, e.g., a transferring member such as a transfer roll or a transfer belt, a developing member such as a developing roll, a charging member such as a charging roll, a sheet feeding and transporting member such as a sheet feed roll, and a cleaning member such as a cleaning roll or a cleaning blade.

Next, an explanation will be given to examples and comparative examples.

Prior to the explanation of the examples and the comparative examples, preparation of the following electrically conductive compositions will be described.

Electrically Conductive Composition (A)

An electrically conductive composition (A) (polyurethane material) was prepared, which contained 90 parts of a polyether polyol (FA718 available from Sanyo Kasei Co. 10 parts of a polymer polyol (POP31-28 available from Mitsui Chemicals, Inc.), 0.5 parts of a tertiary amine catalyst (KAORIZER No.31 available from Kao Corporation), 0.05 parts of a tertiary amine catalyst (TOYOCAT HX-35 available from Toso Co., Ltd.), 2 parts of a foaming agent (water), 2 parts of a silicone based foam stabilizer (L-5309 available from Nippon Uniker Co., Ltd.), B.8 parts of a crude MDI (SUMIDUR 44V20 available from Sumitomo Bayer Urethane Co, Ltd.), 20.5 parts of tolylene diisocianate (TDI-80 available from Mitsui Chemicals, Inc.), and 1 part of a potassium borate compound represented by the formula (2) (LR147 available from Nippon Carlit Co., Ltd.).

Electrically Conductive Composition (B)

An electrically conductive composition (B) (polyurethane material) was prepared in substantially the same manner as the electrically conductive composition (A), except that 1 part of a lithium borate compound represented by the formula (3) (PEL20BBL available from Nippon Carlit Co., Ltd.) was employed instead of 1 part of the potassium borate compound (LR147 available from Nippon Carlit Co., Ltd.).

Electrically Conductive Composition (c)

An electrically conductive composition (C) (polyurethane material) was prepared, which contained 100 parts of diethylene glycol adipate (ODX2376 available from Dainippon Ink and Chemicals, Inc.), 0.5 parts of a tertiary amine catalyst (KAORIZER No.31 available from Kao Corporation), 0.05 parts of a tertiary amine catalyst (TOYOCAT HX-35 available from Toso Co., Ltd.), 2 parts of a foaming agent (water), 2 parts of a silicone based foam stabilizer (L-5309 available from Nippon Uniker Co., Ltd.), 8.8 parts of a crude MDI (SUMIDUR 44V20 available from Sumitomo Bayer Urethane Co, Ltd.), 20.5 parts of tolylene diisocianate (TDI-80 available from Mitsui Chemicals, Inc.), and 1 part of a potassium borate compound (LR147 available from Nippon Carlit Co., Ltd.).

Electrically Conductive Composition (D)

An electrically conductive composition (D) (polyurethane material) was prepared in substantially the same manner as the electrically conductive composition (A), except that the proportion of the potassium borate compound (LR147 available from Nippon Carlit Co., Ltd.) was increased to 20 parts.

Electrically Conductive Composition (E)

An electrically conductive composition (E) (rubber composition) was prepared, which contained 80 parts of NBR containing nitrile at a medium- to high-ratio (JSRN230S available from JSR Co., Ltd.), 20 parts of a liquid NBR (NIPOLE 1312 available from Nippon Zeon Co., Ltd.), 1.5 parts of sulfur (cross-linking agent), 5 parts of ZnO (zinc white No.1, cross-linking assisting agent), 1 part of stearic acid (cross-linking assisting agent), 50 parts of calcium carbonate (filler, WHITEN available from Shiraishi Calcium Co., Ltd.), 0.6 parts of a cross-linking accelerator (NOCCELER TS available from Ouchi Shinko Chemical Industry Co., Ltd.), 1.5 parts of an anti-aging agent (OZONON 3C available from Seika Chemical Co., Ltd.), 1 part of a potassium borate compound (LR147 available from Nippon Carlit Co., Ltd.), 6 parts of N,N'-dinitrosopentamethylenetetramine (DPT, foaming agent), and 6 parts of a foaming assisting agent (CELLTON N available from Sankyo Kasei K.K.).

Electrically Conductive Composition (F)

An electrically conductive composition (F) (rubber composition) was prepared, which contained 100 parts of an epichlorohydrin rubber (EPICHLOMER CG available from Daiso Co., Ltd.), 1.5 parts of sulfur (cross-linking agent), 5 parts of ZnO (zinc white No.1, cross-linking assisting agent), 1 part of stearic acid (cross-linking assisting agent), 50 parts of calcium carbonate (filler, WHITEN available from Shiraishi Calcium Co., Ltd.), 1 part of a cross-linking accelerator (SANCELER CZ available from Sanshin Chemical Industry Co., Ltd.), 1 part of a cross-linking accelerator (NOCCELER BZ available from Ouchi Shinko Chemical Industry Co., Ltd.), 1 part of a potassium borate compound (LR147 available from Nippon Carlit Co., Ltd.), 6 parts of N,N'-dinitrosopentamethylenetetramine (DPT, foaming agent), and 6 parts of a foaming assisting agent (CELLTON N available from Sankyo Kasei K.K.).

Electrically Conductive Composition (C)

An electrically conductive composition (G) (rubber composition) was prepared, which contained 100 parts of a chloroprene rubber (NEOPRENE WRT available from Showa DDE Manufacturing Co., Ltd.), 1.5 parts of a thiourea based cross-linking agent (SANCELER 22C available from Sanshin Chemical Industry Co., Ltd.), 5 parts of ZnO (zinc white No.1, cross-linking assisting agent), 1 part of stearic acid (cross-linking, assisting agent), 30 parts of calcium carbonate (filler, WHITEN available from Shiraishi Calcium Co., Ltd.), 1 part of a potassium borate compound (LR147 available from Nippon Carlit Co., Ltd.), 6 parts of N,N'-dinitrosopentamethylenetetramine (DPT, foaming agent) and 6 parts of a foaming assisting agent (CELLTON N available from Sankyo Kasei K.K.).

Electrically Conductive Composition (H)

An electrically conductive composition (H) (rubber composition) was prepared, which contained 100 parts of an acryl rubber (DENKA ER3400 available from Denki Kagaku Kogyo K.K.), 1 part of an amine based cross-linking agent (Diak No.1 available from Dupont Dow Elastomer Co.), 5 parts of ZnO (zinc white No.1, cross-linking assisting agent), 2 parts of stearic acid (cross-linking assisting agent), 30 parts of calcium carbonate (filler, WHITEN available from Shiraishi Calcium Co., Ltd.), 2 parts of a cross-linking accelerator (SOXINOL DT available from Sumitomo Chemical Co., Ltd.), 1 part of a potassium borate compound (LR147 available from Nippon Carlit Co., Ltd.), 6 parts of N,N'-dinitrosopentamethylenetetramine (DPT, foaming agent), and 6 parts of a foaming assisting agent (CELLTON N available from Sankyo Kasei K.K.).

Electrically Conductive Composition (T)

An electrically conductive composition (I) (rubber composition) was prepared, which contained 80 parts of a natural rubber (RSS #1), 20 parts of a depolymerized liquid natural rubber (DPR available from ELEMENTIS Co., Ltd.), 3.5 parts of sulfur (cross-linking agent), 6 parts of ZnO (zinc white No.1, cross-linking assisting agent), 50 parts of calcium carbonate (filler, WHITEN available from Shiraishi Calcium Co., Ltd.), 1 part of a cross-linking accelerator (NOCCELER DM available from Ouchi Shinko Chemical Industry Co., Ltd.), 1 part of an anti-aging agent (NOCRAC 6C available from Ouchi Shinko Chemical Industry Co., Ltd.), 1part of a potassium borate compound (LR147 available from Nippon Carlit Co., Ltd.), 6 parts of N,N'-dinitrosopentamethylenetetramine (DPT, foaming agent, CELLMIC A available from Sankyo Kasei K.K.), and 6 parts of a foaming assisting agent (CELLTON N available from Sankyo Kasei K.K.).

Electrically Conductive Composition (J)

An electrically conductive composition (J) (rubber composition) was prepared, which contained 100 parts of a urethane rubber (UN278 available from Sakai Chemical Industry Co., Ltd.), 1 part of sulfur (cross-linking agent), 5 parts of ZnO (zinc white No.1, cross-linking assisting agent), 1 part of a cross-linking accelerator (Thanecure available from TSE Industries Co.), 2 parts of a cross-linking accelerator (SOXINOL MP available from Sumitomo Chemical Co., Ltd.), 1 part of a cross-linking accelerator (NOCCELER DM available from Ouchi Shinko Chemical Industry Co., Ltd.), 1 part of a potassium borate compound (LR147-available from Nippon Carlit Co., Ltd.), 6 parts of N,N'-dinitrosopentamethylenetetramine (DPT, foaming agent, CELLMIC A available from Sankyo Kasei K.K.), and 6 parts of a foaming assisting agent (CELLTON N available from Sankyo Kasei K.K.).

Electrically Conductive Composition (K)

An electrically conductive composition (K) (liquid rubber composition) was prepared, which contained 100 parts of a vinyl terminated liquid polyether polymer (SILYL ACX009A available from Kanegafuchi Kagaku Kogyo K.K.), 0.003 parts of a hydrosilylation catalyst, 6.2 parts of a hydrosilyl cross-linking agent represented by the aforesaid formula (8), 1 part of a potassium borate compound (LR147 available from Nippon Carlit Co., Ltd.), and 6 parts of 2,2'-azoisobutyronitrile (AIBN) (foaming agent).

Electrically Conductive Composition (L)

An electrically conductive composition (L) (liquid rubber composition) was prepared, which contained 100 parts of a polyether polyol (polypropylene glycol terminated ethylene oxide having an OH equivalent of 1000, GL3000 available from Sanyo Kasei Co.), 0.0001 part of a chlorinated platinumate (catalyst), 3 parts of an activated hydrogen containing compound (isopropyl alcohol), 25.7 parts of a hydrosilyl cross-linking agent represented by the following formula (12), and 1 part of a potassium borate compound (LR147 available from Nippon Carlit Co., Ltd.).

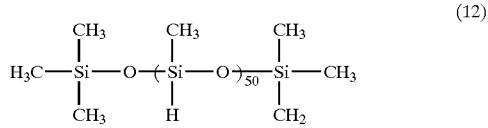

(12)

Electrically Conductive Composition (a)

An electrically conductive composition (a) (polyurethane material) was prepared, which contained 100 parts of a polyoxypropylene glycol (MITECH TN2192 available from Mitsubishi Chemical Corporation), 15 parts of a urethane prepolymer prepared by prepolymerization of PPG with MDI (GP512A available from Mitsubishi Chemical Corporation), and 0.5 parts of a potassium borate compound (LR147 available from Nippon Carlit Co., Ltd.).

Electrically Conductive Composition (b)

An electrically conductive composition (b) (polyurethane material) was prepared in substantially the same manner as the electrically conductive composition (A), except that the potassium borate compound (LR147 available from Nippon Carlit Co., Ltd.) was not blended.

Electrically Conductive Composition (c)

An electrically conductive composition (c) (polyurethane material) was prepared in substantially the same manner as the-electrically conductive composition (A), except that 3 parts of electrically conductive carbon black (KETJEN BLACK EC available from Ketjen Black International Co.) was employed instead of 1 part of the potassium borate compound (LR147 available from Nippon Carlit Co., Ltd.).

Electrically Conductive Composition (d)

An electrically conductive composition (d) (polyurethane material) was prepared in substantially the same manner as the electrically conductive composition (A), except that a lithium perchlorate compound (PEL20A available from Nippon Carlit Co., Ltd.) was employed instead of the potassium borate compound (LR147 available from Nippon Carlit Co., Ltd.).

Electrically Conductive Composition (e)

An electrically conductive composition (e) (polyurethane material) was prepared in substantially the same manner as the electrically conductive composition (A), except that a quaternary ammonium salt (TBAHS available from Lion Corporation) was employed instead of the potassium borate compound (LR147 available from Nippon Carlit Co., Ltd.).

Electrically Conductive Composition (f)

An electrically conductive composition (f) (polyurethane material) was prepared, which contained 100 parts of diethylene glycol adipate (ODX2376 available from Dainippon Ink and Chemicals, Inc.), 0.5 parts of a tertiary amine catalyst (KAORIZER No.31 available from Kao Corporation), 0.05 parts of a tertiary amine catalyst (TOYOCAT HX-35 available from Toso Co., Ltd.), 2 parts of a foaming agent (water), 2 parts of a silicone based foam stabilizer (L-5309 available from Nippon Uniker Co., Ltd.), 8.8 parts of a crude MDI (SUMIDUR 44V20 available from Sumitomo Bayer Urethane Co, Ltd.), 20.5 parts of tolylene diisocyanate (TDI-80 available from Mitsui Chemicals, Inc.), and 1 part of a quaternary ammonium salt (TBAHS available from Lion Corporation).

Electrically Conductive Composition (g)

An electrically conductive composition (g) (rubber composition) was prepared, which contained 80 parts of NBR containing nitrile at a medium- to high-ratio (JSRN230S available from JSR Co., Ltd.), 20 parts of a liquid NBR (NIPOLE 1312 available from Nippon Zeon Co., Ltd.), 1.5 parts of sulfur (cross-linking agent), 5 parts of ZnO (zinc white No.1, cross-linking assisting agent), 1 part of stearic acid (cross-linking assisting agent), 50 parts of calcium carbonate (filler, WHITEN available from Shiraishi Calcium Co., Ltd.), 0.6 parts of a cross-linking accelerator (NOCCELER TS available from Ouchi Shinko Chemical Industry co., Ltd.), 1.5 parts of an anti-aging agent (OZONON 3C available from Seika Chemical Co., Ltd.), 1 part of a quaternary ammonium salt (TBAHS available from Lion Corporation), 6 parts of N,N'-dinitrosopentamethylenetetramine (DPT, foaming agent), and 6 parts of a foaming assisting agent (CELLTON N available from Sankyo Kasei K.K.:).

Electrically Conductive Composition (h)

An electrically conductive composition (h) (rubber composition) was prepared, which contained 100 parts of an epichlorohydrin rubber (EPICHLOMER CG available from Daiso Co., Ltd.), 1.5 parts of sulfur (cross-linking agent), 5 parts of ZnO (zinc white No.1, cross-linking assisting agent), 1 part of stearic acid (cross-linking assisting agent), 50 parts of calcium. carbonate (filler, WHITEN available from Shiraishi Calcium Co., Ltd.), 1 part of a cross-linking accelerator (SANCELER CZ available from Sanshin Chemical Industry Co., Ltd.), 1 part of a cross-linking accelerator (NOCCELER BZ available from Ouchi Shinko chemical Industry Co-, Ltd.), 1 part of a quaternary ammonium salt (TBAHS available from Lion Corporation), 6 parts of N,N'-dinitrosopentamethylenetetramine (DPT, foaming agent), and 6 parts of a foaming assisting agent (CELLTON N available from Sankyo Kasei K.K.).

Electrically Conductive Composition (i)

An electrically conductive composition (i) (rubber composition) was prepared, which contained 80 parts of a natural rubber (RSS #1), 20 parts of a depolymerized liquid natural rubber (DPR available from ELEMENTIS Co., Ltd.), 3.5 parts of sulfur (cross-linking agent), 6 parts of ZnO (zinc white No.1, cross-linking assisting agent), 50 parts of calcium carbonate (filler, WHITEN available from Shiraishi Calcium Co., Ltd.), 1 part of a cross-linking accelerator (NOCCELER DM available from Ouchi Shinko Chemical Industry Co., Ltd.), 1 part of an anti-aging agent (NOCRAC 6C available from Ouchi Shinko Chemical Industry Co., Ltd.), 1 part of a quaternary ammonium salt (TBAHS available from Lion Corporation), 6 parts of N,N'-dinitrosopentamethylenetetramine (DPT, foaming agent, CELLMIC A available from Sankyo Kasei K.K.), and 6 parts of a foaming assisting agent (CELLTON N available from Sankyo Kasei K.K.).

Electrically Conductive Composition (j)

An electrically conductive composition (j) (rubber composition) was prepared, which contained 100 parts of a urethane rubber (UN278 available from Sakai Chemical Industry Co., Ltd.), 1 part of sulfur (cross-linking agent), 5 parts of ZnO (zinc white No.1, cross-linking assisting agent), 1 part of a cross-linking accelerator (Thanecure available from TSE Industries Co.), 2 parts of a cross-linking accelerator (SOXINOL MP available from Sumitomo Chemical Co., Ltd.), 1 part of a cross-linking accelerator (NOCCELER DM available from Ouchi Shinko Chemical Industry Co., Ltd.), 1 part of a quaternary ammonium salt (TBAHS available from Lion Corporation), 6 parts of N,N'-dinitrosopentamethylenetetramine (DPT, foaming agent, CELLMIC A available from Sankyo Kasei K.K.), and 6 parts of a foaming assisting agent (CELLTON N available from Sankyo Kasei K.K.).

Electrically Conductive Composition (k)

An electrically conductive composition (k) (liquid rubber composition) was prepared, which contained 100 parts of a vinyl terminated liquid polyether polymer (SILYL ACX009A available from Kanegafuchi Kagaku Kogyo K.K.), 0.003 parts of chlorinated platinumate (hydrosilylation catalyst), 6.2 parts of a hydrosilyl cross-linking agent represented by the aforesaid formula (8), 1 part of a quaternary ammonium salt (TBAHS available from Lion Corporation), and 6 parts of 2,2'-azoisobutyronitrile (AIBN) (foaming agent).

EXAMPLE 1

A mold for molding a toner supply roll was prepared. After a metal shaft (composed of SUS304 and having a diameter of 5 mm) was set in a cylindrical mold portion of the mold, the electrically conductive composition (A) (polyurethane material) was injected into a mold cavity of the mold, foamed and cross-linked. Then, the resulting product was unmolded. Thus, a toner supply roll was produced, which had an electrically conductive urethane foam layer (having a thickness of 4 mm) formed around the shaft.

EXAMPLES 2 to 12

Toner supply rolls were produced in substantially the same manner as in Example 1, except that the electrically conductive compositions shown in Tables 1 and 2 were employed instead of the electrically conductive composition (A).

COMPARATIVE EXAMPLE 1

A toner supply roll was produced according to an embodiment described in Japanese Unexamined Patent Publication No. HEI10(1998)-48912. More specifically, a mold for molding a toner supply roll was prepared. After a metal shaft (composed of SUS304 and having a diameter of 5 mm) was set in a cylindrical mold portion of the mold, the electrically conductive composition (a) (polyurethane material) was injected into a mold cavity of the mold, and heated and cured at 100° C. for 30 minutes. Then, the resulting product was unmolded. Thus, a toner supply roll was produced, which had a cured urethane layer (having a thickness of 4 mm) formed around the shaft. It is noted that the cured urethane layer is not in a foamed form and, hence, differs from the electrically conductive urethane foam layer according to Example 1.

COMPARATIVE EXAMPLES 2 to 11

Toner supply rolls were produced in substantially the same manner as in Example 1, except that the electrically conductive compositions shown in Tables 3 and 4 were employed instead of the electrically conductive composition (A).

The toner supply rolls of the examples and the comparative examples thus produced were evaluated for their properties in the following manners. The results of the evaluation are shown in Tables 1 to 4.

EXPANSION FACTOR

The pre-foaming specific gravity and post-foaming specific gravity of each of the electrically conductive compositions were measured in conformity with Japanese Industrial Standard (JIS) K7222, and the ratio of the pre-foaming specific gravity to the post-foaming specific gravity was determined as the expansion factor.

Stability of Material

The materials (electrically conductive compositions) were each visually inspected for separation (or sedimentation) after they were stored at a room temperature for one month. For the evaluation of the stabilities of the materials in Tables 1 to 4, a symbol ○ indicates that no separation (nor sedimentation) occurred, and a symbol X indicates that separation (or sedimentation) occurred.

Electrical Resistance (Median)

The toner supply rolls were each placed on a SUS304 plate having a thickness of 5 mm, and then an electrical resistance (median) between the shaft and the plate was measured under conditions of 20 C and 50%RH while opposite ends of the roll were each pressed against the plate with a force of 500 g.

Variation in Electrical Resistance

The electrical resistance of each of the toner supply rolls was measured at ten different points in conformity with the method specified in SRIS2304. At this time, a voltage applied to the roll was 500 V. For the evaluation of the variation in electrical resistance in Tables 1 to 4, a difference between maximum and minimum levels out of the measurements of the electrical resistance at the ten points is shown on a logarithmic basis.

Blooming Resistance

The toner supply rolls were each incorporated in a printer (MICROLINE 400 available from Oki Electric Industry Co., Ltd.), and allowed to stand under conditions of 25° C. and 53% RH for one month. Then, the toner supply roll was visually inspected for blooming. For the evaluation of the blooming resistance in Tables 1 to 4, a symbol ○ indicates that the blooming did not occur, and a symbol X indicates that the blooming occurred.

Cross-linking Rate

For the evaluation of the cross-linking rate in Tables 1 to 4, a symbol ○ indicates that the degree of the cross-linking exceeded 90% within 5 minutes when the electrically conductive composition was cross-linked at a temperature of not higher than 100° C., and a symbol Δ indicates that the degree of the cross-linking exceeded 90% within 15 minutes when the electrically conductive composition was cross-linked at a temperature of not higher than 150° C. A symbol X indicates that the electrically conductive composition falls into neither of the aforesaid categories.

Toner Supply Sustainability

The toner supply rolls were each incorporated in a printer (MICROLINE 400 available from Oki Electric Industry Co., Ltd.) and, after 5,000 printed sheets were outputted, the condition of the toner supply roll was inspected. For the evaluation of the toner supply sustainability in Tables 1 to 4, a symbol ○ indicates that the roll was free from toner clogging and hence exerted no influence on outputted images, and a symbol X indicates that the roll suffered from toner clogging with influenced outputted images.

TABLE 1

| | Example | | | | | |
|---|---|---|---|---|---|---|
| | 1 | 2 | 3 | 4 | 5 | 6 |
| Electrically conductive composition | A | B | C | D | E | F |
| Expansion factor | 10.5 | 11.2 | 9.5 | 4.6 | 2.5 | 4.1 |
| Stability of material | ○ | ○ | ○ | ○ | ○ | ○ |
| Median electrical resistance (Ω) | 3 × 10$^8$ | 2 × 10$^8$ | 2 × 10$^9$ | 1 × 10$^7$ | 7 × 10$^8$ | 8 × 10$^7$ |
| Variation in electrical resistance (on logarithmic basis) | 0.3 | 0.3 | 0.3 | 0.3 | 0.3 | 0.3 |
| Blooming resistance | ○ | ○ | ○ | ○ | ○ | ○ |
| Cross-linking rate | ○ | ○ | ○ | ○ | Δ | Δ |
| Toner supply sustainability | ○ | ○ | ○ | ○ | ○ | ○ |

TABLE 2

| | Example | | | | | |
|---|---|---|---|---|---|---|
| | 7 | 8 | 9 | 10 | 11 | 12 |
| Electrically conductive composition | G | H | I | J | K | L |
| Expansion factor | 2.9 | 3.9 | 3.6 | 4.2 | 6.2 | 9.7 |
| Stability of material | ○ | ○ | ○ | ○ | ○ | ○ |
| Median electrical resistance (Ω) | 4 × 10$^9$ | 1.5 × 10$^9$ | 4 × 10$^9$ | 3 × 10$^8$ | 5 × 10$^8$ | 9 × 10$^7$ |
| Variation in electrical resistance (on logarithmic basis) | 0.3 | 0.3 | 0.3 | 0.3 | 0.3 | 0.3 |
| Blooming resistance | ○ | ○ | ○ | ○ | ○ | ○ |
| Cross-linking rate | Δ | Δ | Δ | Δ | ○ | ○ |
| Toner supply sustainability | ○ | ○ | ○ | ○ | ○ | ○ |

TABLE 3

| | Comparative Example | | | | | |
|---|---|---|---|---|---|---|
| | 1 | 2 | 3 | 4 | 5 | 6 |
| Electrically conductive composition | a | b | c | d | e | f |
| Expansion factor | — | 12.1 | 6.8 | 10.9 | 10.4 | 8.8 |
| Stability of material | ○ | ○ | X | X | X | X |
| Median electrical resistance (Ω) | 2 × 10$^8$ | 3 × 10$^{11}$ | 5 × 10$^8$ | 2 × 10$^8$ | 8 × 10$^8$ | 2 × 10$^9$ |
| Variation in electrical resistance (on logarithmic basis) | 0.2 | 0.2 | 3.2 | 0.3 | 0.3 | 0.3 |
| Blooming resistance | ○ | ○ | ○ | X | X | X |
| Cross-linking rate | ○ | ○ | ○ | ○ | ○ | ○ |
| Toner supply sustainability | X | X | X | X | X | X |

TABLE 4

| | Comparative Example | | | | |
|---|---|---|---|---|---|
| | 7 | 8 | 9 | 10 | 11 |
| Electrically conductive composition | g | h | i | j | k |
| Expansion factor | 2.5 | 4.0 | 2.8 | 4.0 | 3.5 |
| Stability of material | ○ | ○ | ○ | ○ | ○ |
| Median electrical resistance (Ω) | 7 × 10$^8$ | 8 × 10$^7$ | 5 × 10$^9$ | 2 × 10$^9$ | 5 × 10$^9$ |
| Variation in electrical resistance (on logarithmic basis) | 0.3 | 0.3 | 0.3 | 0.3 | 0.3 |
| Blooming resistance | X | X | X | X | X |
| Cross-linking rate | Δ | Δ | Δ | Δ | ○ |
| Toner supply sustainability | X | X | X | X | X |

As can be understood from the results, the materials for the toner supply rolls of the examples were highly stable. Further, the toner supply rolls of the examples had stable electrically conductive properties., and were free from blooming. Thus, the toner supply rolls of the examples were excellent in toner supply sustainability.

On the other hand, the toner supply roll of Comparative Example 1 was inferior in toner carrying capability and incapable of properly charging toner, because the electrically conductive layer thereof was not foamed. The toner supply roll of Comparative Example 2 was free from blooming because the electrically conductive layer thereof contained no electrically conductive agent, but inferior in toner supply sustainability with an excessively high median electrical resistance. The toner supply roll of Comparative Example 3 was free from blooming because the electrically conductive layer thereof contained the solid electrically conductive carbon black, but inferior in toner supply sustainability with a greater variation in electrical resistance. The toner supply rolls of Comparative Examples 4 to 11 suffered from blooming because the electrically conductive layers thereof contained the ionic electrically conductive agents and, therefore, are inferior in toner supply sustainability.

EXAMPLE 13

A transfer roll including a base layer, an intermediate layer and a surface layer was produced in the following manner.

Preparation of Material for Base Layer

As a material for the base layer, the electrically conductive composition (A) was prepared in the aforesaid manner.

Preparation of Material for Intermediate Layer

A material for the intermediate layer was prepared by dissolving a methoxymethylated nylon (TORESIN EF30T available from Nagase Chemtech Co., Ltd.) in a solvent mixture of methanol and water and dispersing 10 parts of Ketjen Black in the resulting mixture.

Preparation of Material for Surface Layer

A material for the surface layer was prepared by dissolving a tetrafluoropropane-vinylidene fluoride copolymer (KYNAR SL available from Elfatochem Japan, Inc.) in methyl ethyl ketone (MEK) and dispersing 60 parts of electrically conductive titanium oxide (TITANIUM BLACK 13M available from Mitsubishi Material Corporation) in the resulting mixture.

Production of Transfer Roll

A metal shaft (composed of SUS304 and having a diameter of 10 mm) was set in a mold for injection molding, and the base layer material was injected into the mold and heated at 150° C. for 45 minutes. The resulting product was unmolded. Thus, a base layer (having a thickness of 3 mm) was formed around the shaft. Then, the intermediate layer material was applied on the peripheral surface of the base layer, whereby an intermediate layer (having a thickness of 10 $\mu$m) was formed. Subsequently, the surface layer material was applied on the peripheral surface of the intermediate layer, whereby a surface layer (having a thickness of 10 $\mu$m) was formed. Thus, a transfer roll was produced, which included the base layer provided around the shaft, the intermediate layer provided on the peripheral surface of the base layer and the surface layer provided on the peripheral surface of the intermediate layer.

EXAMPLES 14 to 24

Transfer rolls were produced in substantially the same manner as in Example 13, except that the electrically conductive compositions shown in Tables 5 and 6 were employed as the base layer material.

The transfer rolls of the examples thus produced were evaluated for their properties in the following manner. The results of the evaluation are shown in Tables 5 and 6.

Electrical Resistance (Median)

The measurement was performed in the same manner as the measurement for the toner supply rolls.

Variation in Electrical Resistance

The measurement was performed in the same manner as the measurement for the toner supply rolls.

Transfer Characteristics

The transfer rolls were each incorporated in a commercially available color printer, and an output image (halftone image) was evaluated. For the evaluation of the transfer characteristics in Tables 5 and 6, a symbol ○ indicates that the halftone image was free from density inconsistency, thin line discontinuation and color misregistration, and a symbol X indicates that the halftone image suffered from density inconsistency, thin line discontinuation or color misregistration.

TABLE 5

| | Example | | | | | |
|---|---|---|---|---|---|---|
| | 13 | 14 | 15 | 16 | 17 | 18 |
| Electrically conductive composition | A | B | C | D | E | F |
| Median electrical resistance ($\Omega$) | $6 \times 10^6$ | $4 \times 10^6$ | $4 \times 10^7$ | $2 \times 10^7$ | $2 \times 10^7$ | $2 \times 10^6$ |
| Variation in electrical resistance (on logarithmic basis) | 0.2 | 0.2 | 0.2 | 0.2 | 0.2 | 0.2 |
| Transfer characteristics | ○ | ○ | ○ | ○ | ○ | ○ |

TABLE 6

| | Example | | | | | |
|---|---|---|---|---|---|---|
| | 19 | 20 | 21 | 22 | 23 | 24 |
| Electrically conductive composition | G | H | I | J | K | L |
| Median electrical resistance ($\Omega$) | $8 \times 10^7$ | $5 \times 10^7$ | $8 \times 10^7$ | $7 \times 10^6$ | $1 \times 10^9$ | $2 \times 10^8$ |
| Variation in electrical resistance (on logarithmic basis) | 0.2 | 0.2 | 0.2 | 0.2 | 0.2 | 0.2 |
| Transfer characteristics | ○ | ○ | ○ | ○ | ○ | ○ |

As can be understood from the results, the transfer rolls of the examples were excellent in transfer characteristics with a smaller variation in electrical resistance.

EXAMPLE 25

A developing roll including a base layer, an intermediate layer and a surface layer was produced in the following manner.

Preparation of Material for Base Layer

As a material for the base layer, the electrically conductive composition (A) was prepared in the aforesaid manner.

Preparation of Material for Intermediate Layer

A material for the intermediate layer was prepared by dissolving a methoxymethylated nylon (TORESIN EF30T available from Nagase Chemtech Co., Ltd.) in a solvent mixture of methanol and water and dispersing 10 parts of Ketjen Black in the resulting mixture.

Preparation of Material for Surface Layer

A material for the surface layer was prepared by dissolving a thermoplastic urethane elastomer (TPU) in MEK and dispersing 8 parts of acetylene black (DENKA BLACK HS-100 available from Denki Kagaku Kogyo K.K.) and 15 parts of acrylsilicone (ARON GS-30 available from Toa Gosei Co., Ltd.) in the resulting mixture.

Production of Developing Roll

A metal shaft (composed of SUS304 and having a diameter of 10 mm) was set in a mold for injection molding, and the base layer material was injected into the mold and heated at 150° C. for 45 minutes. The resulting product was unmolded. Thus, a base layer (having a thickness of 3 mm) was formed around the shaft. Then, the intermediate layer material was applied on the peripheral surface of the base layer, whereby an intermediate layer (having a thickness of 10 μm) was formed subsequently, the surface layer material was applied on the peripheral surface of the intermediate layer, whereby a surface layer (having a thickness of 10 μm) was formed. Thus, a developing roll was produced, which included the base layer provided around the shaft, the intermediate layer provided on the peripheral surface of the base layer and the surface layer provided on the peripheral surface of the intermediate layer.

EXAMPLES 26 to 36

Developing rolls were produced in substantially the same manner as in Example 25, except that the electrically conductive compositions shown in Tables 7 and 8 were employed as the base layer material.

The developing rolls of the examples thus produced were evaluated for their properties in the following manner. The results of the evaluation are shown in Tables 7 and 8.

Electrical Resistance (Median)

The measurement was performed in the same manner as the measurement for the toner supply rolls.

Variation in Electrical Resistance

The measurement was performed in the same manner as the measurement for the toner supply rolls.

Developing Characteristics

The developing rolls were each incorporated in a commercially available color printer, and an output image (halftone image) was evaluated. For the evaluation of the developing characteristics in Tables 7 and 8, a symbol ○ indicates that the halftone image was-free from density inconsistency, thin line discontinuation, color misregistration and toner scattering, and a symbol X indicates that the halftone image suffered from density inconsistency, thin line discontinuation, color misregistration or toner scattering.

TABLE 7

|  | Example | | | | | |
| --- | --- | --- | --- | --- | --- | --- |
|  | 25 | 26 | 27 | 28 | 29 | 30 |
| Electrically conductive composition | A | B | C | D | E | F |
| Median electrical resistance (Ω) | 9 × 10$^6$ | 7 × 10$^6$ | 5 × 10$^7$ | 2.5 × 10$^7$ | 2 × 10$^7$ | 3 × 10$^6$ |
| Variation in electrical resistance (on logarithmic basis) | 0.2 | 0.2 | 0.2 | 0.2 | 0.2 | 0.2 |
| Developing characteristics | ○ | ○ | ○ | ○ | ○ | ○ |

TABLE 8

|  | Example | | | | | |
| --- | --- | --- | --- | --- | --- | --- |
|  | 31 | 32 | 33 | 34 | 35 | 36 |
| Electrically conductive composition | G | H | I | J | K | L |
| Median electrical resistance (Ω) | 1.5 × 10$^8$ | 5 × 10$^8$ | 1 × 10$^8$ | 1 × 10$^7$ | 1.5 × 10$^9$ | 9 × 10$^7$ |
| Variation in electrical resistance (on logarithmic basis) | 0.2 | 0.2 | 0.2 | 0.2 | 0.2 | 0.2 |

TABLE 8-continued

|  | Example | | | | | |
| --- | --- | --- | --- | --- | --- | --- |
|  | 31 | 32 | 33 | 34 | 35 | 36 |
| Developing characteristics | ○ | ○ | ○ | ○ | ○ | ○ |

As can be understood from the results, the developing rolls of the examples were excellent in developing characteristics with a smaller variation in electrical resistance.

EXAMPLE 37

A charging roll including a base layer, an intermediate layer and a surface layer was produced in the following manner.

Preparation of Material for Hasp Layer

As a material for the base layer, the electrically conductive composition (A) was prepared in the aforesaid manner.

Preparation of Material for Intermediate Layer

A material for the intermediate layer was prepared by dissolving a methoxymethylated nylon (TORESIN EF30T available from Nagase Chemtech Co., Ltd) in a solvent mixture of methanol and water and dispersing 10 parts of Ketjen Black in the resulting mixture.

Preparation of Material for Surface Layer

A material for the surface layer was prepared by dissolving a tetrafluoropropane-vinylidene fluoride copolymer (KYNAR SL available from Elfatochem Japan, Inc.) in methyl ethyl ketone (MEK) and dispersing 60 parts of electrically conductive titanium oxide (TITANIUM BLACK 13M available from Mitsubishi Material Corporation) in the resulting mixture.

Production of Charging Roll

A metal shaft (composed of SUS304 and having a diameter of 10 mm) was set in a mold for injection molding, and the base layer material was injected into the mold and heated at 150° C. for 45 minutes. The resulting product was unmolded. Thus, a base layer (having a thickness of 3 mm) was formed around the shaft. Then, the intermediate layer material was applied on the peripheral surface of the base layer, whereby an intermediate layer (having a thickness of 10 μm) was formed. Subsequently, the surface layer material was applied on the peripheral surface of the intermediate layer, whereby a surface layer (having a thickness of 10 μm) was formed. Thus, a charging roll was produced, which included the base layer provided around the shaft, the intermediate layer provided on the peripheral surface of the base layer and the surface layer provided on the peripheral surface of the intermediate layer.

EXAMPLES 38 to 48

Charging rolls were produced in substantially the same manner as in Example 37, except that the electrically conductive compositions shown in Tables 9 and 10 were employed as the base layer material.

The charging rolls of the examples thus produced were evaluated for their properties in the following manner. The results of the evaluation are shown in Tables 9 and 10.

Electrical Resistance (Median)

The measurement was performed in the same manner as the measurement for the toner supply rolls.

Variation in Electrical Resistance

The measurement was performed in the same manner as the measurement for the toner supply rolls.

Charging Characteristics

The charging rolls were each incorporated in a commercially available color printer, and an output image (halftone image) was evaluated. For the evaluation of the charging characteristics in Tables 9 and 10, a symbol ○ indicates that the halftone image was free from density inconsistency, thin line discontinuation, color misregistration and black and white streaks, and a symbol X indicates that the halftone image suffered from density in consistency, thin line discontinuation, color misregistration or black and white streaks.

TABLE 9

| | Example | | | | | |
|---|---|---|---|---|---|---|
| | 37 | 38 | 39 | 40 | 41 | 42 |
| Electrically conductive composition | A | B | C | D | E | F |
| Median electrical resistance ($\Omega$) | $6 \times 10^6$ | $3 \times 10^6$ | $3 \times 10^7$ | $1.5 \times 10^7$ | $1.5 \times 10^7$ | $1.8 \times 10^6$ |
| Variation in electrical resistance (on logarithmic basis) | 0.2 | 0.2 | 0.2 | 0.2 | 0.2 | 0.2 |
| Charging characteristics | ○ | ○ | ○ | ○ | ○ | ○ |

TABLE 10

| | Example | | | | | |
|---|---|---|---|---|---|---|
| | 43 | 44 | 45 | 46 | 47 | 48 |
| Electrically conductive composition | G | H | I | J | K | L |
| Median electrical resistance ($\Omega$) | $7 \times 10^7$ | $1.3 \times 10^9$ | $6 \times 10^7$ | $7 \times 10^6$ | $1.5 \times 10^9$ | $2.5 \times 10^8$ |
| Variation in electrical resistance (on logarithmic basis) | 0.2 | 0.2 | 0.2 | 0.2 | 0.2 | 0.2 |
| Charging characteristics | ○ | ○ | ○ | ○ | ○ | ○ |

As can be understood from the results, the charging rolls of the examples were excellent in charging characteristics with a smaller variation in electrical resistance.

EXAMPLE 49

The electrically conductive composition (A) (polyurethane material) was prepared in the aforesaid manner. A mold was prepared, and a metal shaft (composed of SUS304 and having a diameter of 5 mm) was set in a cylindrical mold portion of the mold. Then, the electrically conductive composition (A) was injected into a mold cavity of the mold, foamed and cross-linked. Thereafter, the resulting product was unmolded, and the surface of the product was polished. Thus, a sheet feed roll was produced, which included an electrically conductive foam layer (having a thickness of 4 mm) provided around the shaft.

EXAMPLES 50 to 60

Sheet feed rolls were produced in substantially the same manner as in Example 49, except that electrically conductive compositions shown in Tables 11 and 12 were employed.

The sheet feed rolls of the examples thus produced were evaluated for their properties in the following manner. The results of the evaluation are shown in Tables 11 and 12.

Electrical Resistance (Median)

The measurement was performed in the same manner as the measurement for the toner supply rolls.

Variation in Electrical Resistance

The measurement was performed in the same manner as the measurement for the toner supply rolls.

Sheet Feeding Characteristic

The sheet feed rolls were each incorporated in a commercially available color printer, and a sheet feeding state was evaluated. For the evaluation of the sheet feeding characteristics in Tables 11 and 12, a symbol ○ indicates that plural-sheet feeding (which means that two or more sheets were fed at a time) did not occur when 10,000 image-formed sheets were continuously outputted, and a symbol X indicates that the plural-sheet feeding occurred.

TABLE 11

| | Example | | | | | |
|---|---|---|---|---|---|---|
| | 49 | 50 | 51 | 52 | 53 | 54 |
| Electrically conductive composition | A | B | C | D | E | F |
| Median electrical resistance ($\Omega$) | $2.5 \times 10^8$ | $2 \times 10^8$ | $3.1 \times 10^9$ | $1.8 \times 10^9$ | $6 \times 10^8$ | $7 \times 10^7$ |
| Variation in electrical resistance (on logarithmic basis) | 0.3 | 0.3 | 0.3 | 0.3 | 0.3 | 0.3 |
| Sheet feeding characteristics | ○ | ○ | ○ | ○ | ○ | ○ |

TABLE 12

| | Example | | | | | |
|---|---|---|---|---|---|---|
| | 55 | 56 | 57 | 58 | 59 | 60 |
| Electrically conductive composition | G | H | I | J | K | L |
| Median electrical resistance ($\Omega$) | $2.5 \times 10^9$ | $1 \times 10^9$ | $5 \times 10^9$ | $3 \times 10^8$ | $5 \times 10^8$ | $8 \times 10^7$ |
| Variation in electrical resistance (on logarithmic basis) | 0.3 | 0.3 | 0.3 | 0.3 | 0.3 | 0.3 |
| Sheet feeding characteristics | ○ | ○ | ○ | ○ | ○ | ○ |

As can be understood from the results, the sheet feed rolls of the examples were excellent in sheet feeding characteristics with a smaller variation in electrical resistance.

EXAMPLE 61

The electrically conductive composition (A) (polyurethane material) was prepared in the aforesaid manner. A mold was prepared, and a metal shaft (composed of SUS304 and having a diameter of 5 mm) was set in a cylindrical mold portion of the mold. Then, the electrically conductive composition (A) was injected into a mold cavity of the mold, foamed and cross-linked. Thereafter, the resulting product was unmolded, and the surface of the product was polished. Thus, a cleaning roll was produced, which included an electrically conductive foam layer (having a thickness of 4 mm) provided around the shaft.

EXAMPLES 62 to 72

Cleaning rolls were produced in substantially the same manner as in Example 61, except that electrically conductive compositions shown in Tables 13 and 14 were employed.

The cleaning rolls of the examples thus produced were evaluated for their properties in the following manners. The results of the evaluation are shown in Tables 13 and 14.

Electrical Resistance (Median)

The measurement was performed in the same manner as the measurement for the toner supply rolls.

Variation in Electrical Resistance

The measurement was performed in the same manner as the measurement for the toner supply rolls.

Cleaning Characteristics

The cleaning rolls were each incorporated in a commercially available color printer, and an output image was evaluated. For the evaluation of the cleaning characteristics in Tables 13 and 14, a symbol ○ indicates that the output image was free from unwanted toner scattering and streaks, and a symbol X indicates that the output image suffered from unwanted toner scattering or streaks.

TABLE 13

| | Example | | | | | |
|---|---|---|---|---|---|---|
| | 61 | 62 | 63 | 64 | 65 | 66 |
| Electrically conductive composition | A | B | C | D | E | F |
| Median electrical resistance (Ω) | $2 \times 10^8$ | $1.5 \times 10^8$ | $1.8 \times 10^9$ | $1.2 \times 10^9$ | $3 \times 10^8$ | $5 \times 10^7$ |
| Variation in electrical resistance (on logarithmic basis) | 0.3 | 0.3 | 0.3 | 0.3 | 0.3 | 0.3 |
| Cleaning characteristics | ○ | ○ | ○ | ○ | ○ | ○ |

TABLE 14

| | Example | | | | | |
|---|---|---|---|---|---|---|
| | 67 | 68 | 69 | 70 | 71 | 72 |
| Electrically conductive composition | G | H | I | J | K | L |
| Median electrical resistance (Ω) | $3 \times 10^9$ | $1.2 \times 10^9$ | $2.5 \times 10^9$ | $2.5 \times 10^9$ | $3 \times 10^8$ | $8 \times 10^7$ |
| Variation in electrical resistance (on logarithmic basis) | 0.3 | 0.3 | 0.3 | 0.3 | 0.3 | 0.3 |
| Clean characteristics | ○ | ○ | ○ | ○ | ○ | ○ |

As can be understood from the results, the cleaning rolls of the examples were excellent in cleaning characteristics with a smaller variation in electrical resistance.

As described above, the electrically conductive foam component according to the present invention is produced by foaming the electrically conductive composition containing the borate compound represented by the general formula (1). Since this borate compound is highly compatible with the base polymer, the electrically conductive composition is free from separation (or sedimentation) during storage thereof and highly stable. Therefore, the electrically conductive foam component is free from blooming over time. The borate compound is slightly inferior in electrical conductivity to the quaternary ammonium salt, but imparts the electrically conductive foam component with a stable electrically conductive property.

Where the base polymer is a urethane polymer derived from an ether based polyol or an ester based polyol, the base polymer is highly compatible with the borate compound represented by the general formula (1), and the electrically conductive foam component has a reduced electrical resistance and an increased expansion factor.

Where the base polymer is a liquid polymer, the expansion factor and the cross-linking rate are increased.

Where an isocyanate or a hydrosilyl cross-linking agent is contained as a cross-linking agent in the electrically conductive composition, the electrically conductive composition has a higher cross-linking rate.

What is claimed is:

1. An electrically conductive foam component produced by foaming an electrically conductive composition which comprises a base polymer and an organic boron compound represented by the following general formula (1):

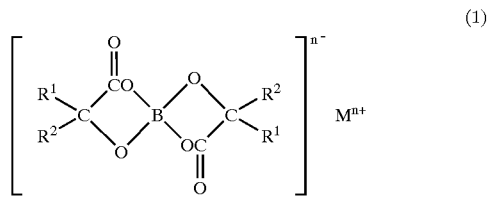

(1)

wherein $R^1$ and $R^2$, which may be the same or different, each represents a hydrogen atom, an alkyl group or an aryl group; M is an alkaline metal or an alkaline earth metal; and n is a positive number.

2. An electrically conductive foam component as set forth in claim 1, wherein the base polymer comprises at least one polymer selected from the group consisting of a urethane polymer, a polar rubber and a natural rubber.

3. An electrically conductive foam component as set forth in claim 2, wherein the urethane polymer is a polymer derived from one of an ether based polyol and an ester based polyol.

4. An electrically conductive foam component as set forth in claim 2, wherein the polar rubber comprises at least one rubber selected from the group consisting of acrylonitrile-butadiene rubbers, epichlorohydrin rubbers, chloroprene rubbers, acryl rubbers, urethane rubbers, and rubbers having a polyoxyalkylene unit.

5. An electrically conductive foam component as set forth in claim 1, wherein the base polymer is a liquid polymer.

6. An electrically conductive foam component as set forth in claim 1, wherein the electrically conductive composition further comprises a cross-linking agent selected from the group consisting of isocyanates and hydrosilyl cross-linking agents.

7. An electrically conductive foam component as set forth in claim 1, which has an expansion factor of 2 to 12.

8. An electrophotographic apparatus member comprising an electrically conductive foam component as set forth in claim 1.

9. An electrophotographic apparatus member as set forth in claim 8, wherein the member is one of a toner supplying member, a transferring member, a developing member, a charging member, a sheet feeding and transporting member and a cleaning member.

10. An electrophotographic apparatus member as set forth in claim 8, which is a toner supply member.

* * * * *